United States Patent Office 3,333,385
Patented Aug. 1, 1967

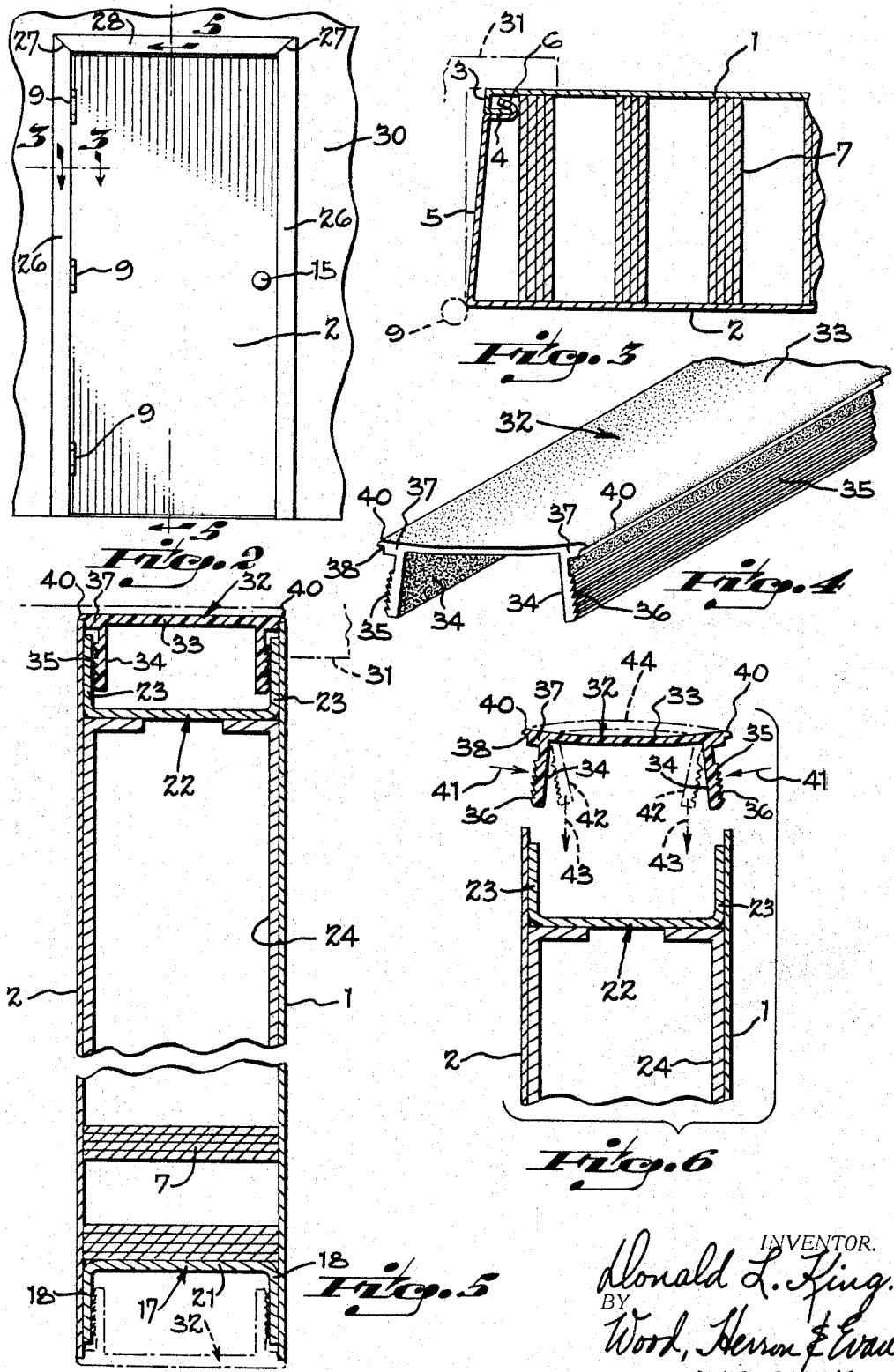

3,333,385
CLOSURE CAPS FOR COMPOSITE DOORS
Donald L. King, Loveland, Ohio, assignor to The Steelcraft Manufacturing Company, Rossmoyne, Ohio, a corporation of Ohio
Filed Sept. 14, 1964, Ser. No. 396,110
3 Claims. (Cl. 52—624)

This invention relates to composite doors for buildings, particularly exterior or storm doors which are exposed to the weather. The invention is directed particularly to a closure cap adapted to be installed along the upper marginal edge portion of the assembled composite door (and, if necessary along the bottom and side edges) in order to prevent moisture from penetrating into the interior of the door, thereby to prevent deterioration of the door structure.

Described generally, a composite door of the type for which the present closure cap is particularly intended, includes inner and outer panels spaced apart from one another with an internal core or filler of honeycomb construction preferably formed of plastic or other organic material to impart stiffness to the composite door and to also provide a sound deadening effect. The panels (which may be formed of sheet metal), include side flanges joining the spaced panels and forming the side edges of the door. The upper edge of the door (as well as the lower edge) includes a stiffening member comprising a channel having an open side facing upwardly and exposed to the weather.

In fabricating the door, the conventional lock is mounted between the panels, the flanges of the panels are joined to one another, with the filler or core disposed between the panels, the assembly being completed preferably by a spot welding operation. The door is then ready to be installed in a door frame which is mounted in the rough door opening in the usual way. However, the open face, which is presented by the top reinforcement channel, is thus exposed to the weather and also detracts from the neat and trim appearance of the door.

One of the primary objectives of the invention therefore, has been to provide a closure cap in the form of a strip, which may be inserted rapidly and in a convenient manner into the open side of the top channel, thereby to provide a weather seal and to improve the appearance of the door without interfering with the assembly procedures which are carried out in initially fabricating the composite door.

Described generally, the closure cap of the present invention comprises a strip formed of a resilient material, for example, one of the slightly resilient plastics which are resistant to the weather. The cap is generally of channel-shape, providing opposed legs which interfit the open face which is delineated by the reinforcing top channel. The channel-shaped strip is rigid along its longitudinal axis but its limbs are resilient in a direction transverse to the longitudinal axis of the strip. The closure cap may be fabricated by the extrusion process and is adapted to be forcibly inserted within the open side of the outwardly facing channel.

A further objective of the invention has been to provide a top closure cap of the above-described type which does not require the use of adhesives or other fastening means, thereby to facilitate rapid, convenient installation in the assembled door.

According to this aspect of the invention, the parallel limbs of the closure cap are serrated to form a series of parallel saw teeth providing sharp edges which are in pressure engagement with the opposed surfaces of the open sides of the reinforcing channel into which it is inserted. The serrated surface thus increases the frictional engagement of the limbs with respect to the surface of the channel to lock the closure cap frictionally in place and also aid in providing a weather seal. The channel-shape closure cap includes marginal edges overhanging the edges of the door panels so as to provide the weather seal.

Another aspect of the invention has been to increase the spring pressure developed by the limbs of the channel-shaped cap thereby to increase the degree of frictional engagement of the limbs with respect to the open side of the channel into which the cap is inserted. According to this feature, the top web of the closure cap, as initially formed, is slightly concave, with the limbs, which project from the web, diverging outwardly.

When the closure cap is inserted into the open face of the channel, the limbs are forced toward one another by means of a simple tool, so as to interfit the open side of the channel. Upon being released, the concave web of the channel forces the limbs under pressure engagement outwardly into engagement with the surfaces of the open face of the channel, the arrangement being such that the previously concave top web of the channel now assumes a horizontal position extending across the top edge of the door.

The various features and advantages of the invention will be more clearly apparent to those skilled in the art from the following description taken in conjunction with the drawings.

In the drawings:

FIGURE 2 is a general elevational view, illustrating the sheet metal door installed in its frame.

FIGURE 3 is an enlarged fragmentary sectional view, taken along line 3—3 of FIGURE 2, detailing the hinged side edge portion of the door.

FIGURE 4 is a fragmentary perspective view illustrating the closure cap of the present invention before installation in the door.

FIGURE 5 is an enlarged fragmentary sectional view, taken along line 5—5 of FIGURE 2, detailing the composite door with the closure cap inserted in the upper edge portion of the door.

FIGURE 6 is a fragmentary sectional view taken from FIGURE 5, showing the manner of applying the closure cap to the assembled door.

*Door structure generally*

Figure 1:
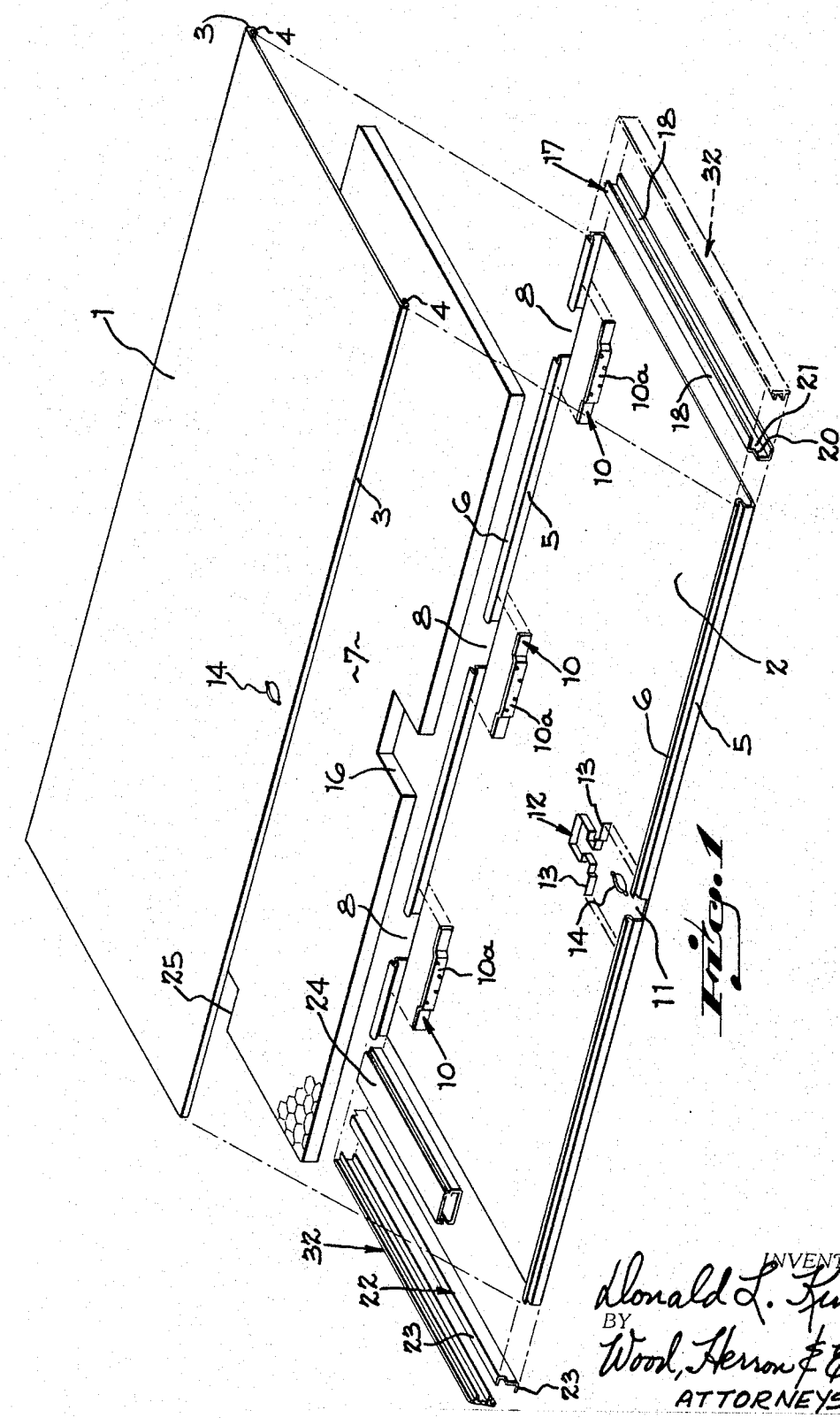
FIGURE 1 is an exploded perspective view showing, in a general way, the internal construction of a typical sheet metal door for which the present closure cap is intended.

Described generally with reference to FIGURE 1, a typical sheet metal door assembly, for which the present closure cap is intended, is of composite design and is formed from prefabricated sheet metal components which are suitably joined to one another, for example, by spot welding. Thus, as shown in FIGURE 1, the door comprises respective panels 1 and 2 formed of sheet metal. The panel 1 includes side flanges 3—3 having inturned lips 4. The panel 2 includes side flanges 5—5 which form the side edges of the assembled door. The free edge of each flange 5 is bent to form a groove 6 adapted to receive the mating lip 4 of the panel 1. The two panels are shown in assembled position in FIGURE 3.

The door includes a filler or core 7 (FIGURE 1) of honeycomb design, which may be formed of wood or other material. The filler or core 7 fits snugly between the assembly door panels 1 and 2 to reinforce the composite door and also to provide a sound deadening effect.

The side flanges 5 of panel 2 along the hinged side of the door include cut-out portions, as indicated at 8, to provide clearance for the hinges 9 (FIGURE 2) upon which the door is to be swung. In addition, the panel 2 includes hinge reinforcement brackets 10 (FIGURE 1) each having a recessed portion 10a arranged to register with the cut-out portions 8 and to seat the leaf of the hinge. The recessed portions 10a include holes into which are threaded the spring-mounting screws. The hinge reinforcement brackets 10 are shown spaced from the cut-out portions 8 in order to clarify FIGURE 1. It will be understood that the brackets span the cut-out portions 8 and are preferably spot welded in place.

Each flange 5 along the free or swinging edge of the door includes a cut-out portion 11 adapted to receive the door lock (not shown). A reinforcing bracket 12, which is adapted to reinforce the lock assembly, is mounted between the panels 1 and 2. The reinforcement bracket 12 is generally U-shaped to receive the lock and includes ears 13—13. The lock reinforcement bracket 12 is secured in place with its ears 13 preferably spot welded to the flange 5 of panel 2, spanning cut-out portion 11, such that the latch element of the lock projects outwardly through the cut-out portion 11.

The lock reinforcement bracket 12 is secured in place and the lock is installed therein during assembly of the door, the filler 7, having a cut-out portion 16 to accommodate the lock bracket 12. The panels 1 and 2 each include an opening 14 to accommodate the door knobs 15 (FIGURE 2). The door knobs 15 (FIGURE 2) are installed in the usual manner after the composite door is assembled with the lock installed in place between the panels 1 and 2.

The lower edge of the door is closed off by means of a reinforcing channel 17 (FIGURES 1 and 5). The limbs 18—18 of the channel are spaced apart at a distance corresponding to the thickness of the honeycomb filler 7 so as to delineate the spacing of the panels 1 and 2 along the lower edge portion of the composite door. The opposite ends of the channel 17 are notched out as at 20 to accommodate the grooved portions 6—6 of panel 2. The channel is secured permanently in position, preferably by spot welding, with its limbs 18 facing downwardly, such that the lower edge of the filler 7 rests upon the web 21 of channel 17 (FIGURE 5).

The upper edge of the door is delineated by a reinforcing channel member 22 which is similar to the channel 17 of the lower edge portion of the door (FIGURES 1 and 5). Channel 22 includes limbs 23—23 seated against the panels 1 and 2 and preferably spot welded in place, as described with reference to the lower channel 17.

In order to further reinforce the upper edge portion of the door for mounting a door closing device (if one is required) there is provided a reinforcing element 24 having the same width as the reinforcing channels 17 and 22 and preferably secured in place between panels 1 and 2 by spot welding. The reinforcing element 24 is located in the hinged edge portion of the composite door and the filler 7 includes a cut-out portion 25 (FIGURE 1) to accommodate the reinforcing element 24.

The assembled door is mounted in the usual way in a door frame (preferably formed of sheet metal) comprising vertical jambs 26—26 mitered as at 27 to interfit a correspondingly mitered header 28 (FIGURE 2). The jambs and header embrace the opposite sides of the rough opening of the building wall 30 (FIGURE 2) in the usual way. As shown in broken lines in FIGURES 3 and 5, the jambs 26 and header each include a door stop 31 against which the door seats in its closed position.

As best shown in FIGURES 1 and 6, the top reinforcing channel member 22 faces upwardly, thus forming an open face which is exposed to the weather if the door is mounted in an exterior wall of the building. This open face is undesirable because it tends to accumulate dust; also, rain water or snow and ice, such that moisture may penetrate into the space between the door panels 1 and 2. The closure cap, indicated generally at 32, of the present invention interfits the upwardly facing reinforcing channel 22 so as to provide a seal and also to provide a neat, trim appearance.

*Top closure cap*

As noted earlier, the closure cap 32 of the present invention is formed of a resilient material, such as a plastic, and provides a friction fit with respect to the open face of the top reinforcing channel 22. As outlined earlier, the closure cap 32 is forced in place in a simple manner after the composite door is assembled permanently, installation of the strip 32 being the final step in the assembly operation. As noted earlier, the closure cap 32 is designed for installation without the use of adhesive or other fastening means.

As best shown in FIGURES 1 and 4, the closure cap 32 is generally channel-shaped in cross section, comprising a web 33, with a pair of spaced parallel limbs 34 projecting from the opposite edges of web 33. The U-shaped configuration of closure cap 32 provides a structure which is rigid longitudinally; however, the limbs 34—34 are slightly resilient transversely, whereby the limbs may be sprung toward one another upon insertion of the closure cap into the top reinforcing channel 22.

In order to provide frictional engagement of the limbs 34 of closure cap 32 with the limbs 23 of the top reinforcing channel 22, the outer surfac eof each limb 34 is serrated as at 35 (FIGURES 4 and 6). The serrations (which are generally of saw tooth configuration in cross section) provide a series of sharp edges 36 which provide line engagement with the internal surfaces of the limbs 23 of top channel 22. The plurality of longitudinal line contacts provided by the serrations 35 (after compressive insertion of the closure cap, as explained later) provide a highly efficient frictional engagement with the limbs 23 of top channel 22 and also act as a weather seal.

As best shown in FIGURES 4-6, closure cap 32 includes marginal flanges 37—37 projecting outwardly beyond the limbs 34 at opposite sides. Each marginal flange 37 includes an inset portion 38 which delineates an overhanging lip 40. As best shown in FIGURES 5 and 6, the outer edge portions of the panels 1 and 2 project outwardly beyond the outer edges of limbs 23—23 of channel 22. The insets 38 are dimensioned to interfit the outer edge portions of the panels, such that the lips 40, delineated by the insets 38 overhang the edges of the panels to provide a weather seal.

The top closure cap 32 may be formed by the extrusion process, and as initially formed, the web 33 is bowed transversely to a slightly concave curvature (FIGURE 6). The limbs 34—34, by virtue of the curvature of the web 33, diverge outwardly in opposite directions from the bowed web 33 in the normal condition of the closure cap 32, that is, before the cap is inserted in the door assembly (FIGURE 6). The purpose of the curvature is to impart a transverse spring action to the diverging limbs 34, whereby the limbs may be sprung transversely toward one another upon insertion into the open face of the top reinforcing channel 22.

Thus, as indicated by the arrows 41 (FIGURE 6), the limbs 34 may be sprung inwardly with a suitable tool to the position somewhat as indicated by the broken lines 42; thereafter, the closure cap is inserted into the open face of the channel, as indicated by the arrows 43. When the limbs 34 are thus sprung toward one another, the normally concave web 33 assumes the convex position, approximately as indicated by the broken lines 44 (FIGURE 6).

After the limbs have been inserted (at least partially) into the open face of channel 22 the compressive force is released, thus permitting the limbs 34 to spring outwardly into pressure engagement with the inner surfaces of the limbs 23 of the top channel 22 to provide frictional engagement therewith. If desired, the web 33 of the closure cap may be tapped lightly with a tool to seat the cap firmly upon the upper edge portions of the door panels 1 and 2, thereby to complete the installation. It will be noted in FIGURE 5, that the web 33 of the closure cap 32 is sprung to a flat horizontal plane after the cap is seated within the open face of the top channel 22, with the web exerting the transverse spreading force upon the limbs 34 due to the deflection of the web 33 from its normal concave condition.

By virtue of the spring action, the limbs 34 provide a strong reliable frictional engagement with the open face of the reinforcing channel 22 and provide a weather seal without the use of adhesives. This permits the closure cap to be installed in a rapid efficient manner after the composite door is assembled.

It will be understood from the foregoing, that the closure cap may also be utilized along the lower edge of the door, if desired, as indicated by the broken lines in FIGURES 1 and 5. Similar closure caps may also be installed along the vertical side edges of the door in the event these edges are closed off by outwardly forcing channels similar to the top and bottom channels 17 and 22.

Having described my invention I claim:

1. A closure cap for a composite door of the type having a pair of panels secured in transversely spaced relationship to one another and having an open face presented outwardly, said open face including opposed inner surfaces, said closure cap comprising:
   a generally channel-shaped strip formed of resilient material, said strip being rigid along the longitudinal axis thereof;
   said channel-shaped strip having a web and having a pair of limbs projecting outwardly generally at right angles to the plane of the web, said limbs being resilient in a direction transverse to the longitudinal axis of said strip;
   a series of longitudinal serrations formed in the outer surface of each of said limbs, said serrations being of saw tooth configuration in cross section providing a series of sharp edges seated in line pressure engagement with the opposed inner surfaces of said pair of panels, thereby providing line weather seals and providing a frictional engagement with the said opposed inner surfaces;
   the web of said channel-shaped strip being formed initially to a concave configuration in cross section in a direction to cause said limbs normally to diverge outwardly relative to one another from the plane of the web;
   said limbs being sprung inwardly toward one another and inserted into the said open face, with the serrations thereof in pressure engagement with the opposed inner surfaces of the said open face and with said limbs disposed generally in parallelism with one another, thereby springing said normally concave web to a substantially flat formation, with the web spanning the said open face;
   said web having marginal flanges projecting outwardly on opposite sides beyond said limbs, said marginal flanges overhanging the edges of said reinforcing channel and providing a sealing engagement therewith.

2. A closure cap for a composite door of the type having a pair of panels disposed in transversely spaced relationship, the composite door including a reinforcing channel disposed along a marginal edge portion therewith and secured to said panels to hold the same in spaced relationship, with the open face of the channel presented outwardly, said open face including opposed inner surfaces, said closure cap comprising:
   a generally channel-shaped strip formed of resilient material;
   said channel-shaped strip having a web and a pair of limbs projecting outwardly from said web substantially at right angles to the plane of the web;
   the web of said channel-shaped strip being formed initially to a concave configuration in cross section in a direction to cause the said limbs normally to diverge outwardly relative to one another from the plane of the web;
   a marginal flange projecting outwardly beyond said limbs along opposite sides of the closure cap and being disposed in the plane of said web;
   at least one serration formed on the outer portion of each of said limbs, each of said serrations being of saw tooth configuration in cross section, providing a sharp edge;
   said limbs adapted to be sprung transversely toward one another to a converging relationship, thereby to interfit the opposed inner surfaces presented by the said open face of said reinforcing channel;
   said limbs adapted to spring outwardly into forcible engagement with the opposed inner surfaces of said reinforcing channel, with the web extending across the edges of said channel in a generally flat plane, and with the flanges of said web overhanging the edges of said channel, thereby providing a seal;
   said limbs adapted to provide pressure engagement with the opposed inner surface of the channel, with the edges of said serrations providing line pressure engagement with the internal surfaces of the channel to frictionally lock the closure cap within the channel and providing line pressure seals.

3. A closure cap for a composite door of the type having a pair of panels disposed in transversely spaced relationship, the composite door including a reinforcing channel disposed along a marginal edge portion thereof, said reinforcing channel having a web and having a pair of spaced limbs projecting outwardly from the web and providing an open face having opposed inner surfaces, the outer edges of said limbs being spaced inwardly relative to the outer edges of said panels, said limbs being secured to said panels to hold the same in spaced relationship, said closure cap comprising:
   a generally channel-shaped strip formed of material which is relatively rigid longitudinally and resilient transversely;
   said channel-shaped strip having a normally concave web and a pair of normally diverging limbs projecting outwardly from said web substantially at right angles to the plane of the web;
   a marginal flange projecting outwardly beyond said limbs along opposite sides of the closure cap and being disposed in the plane of said web;
   each of said marginal flanges including an inset portion coextensive therewith and delineating an outwardly projecting lip, said inset portions adapted to interfit the outer edge portions of said transversely spaced panels which project outwardly beyond the limbs of the reinforcing channel;
   at least one serration formed on the outer portion of said limbs;
   said limbs adapted to be sprung transversely toward one another to a converging relationship, thereby to interfit the open face of said reinforcing channel;
   said limbs adapted to spring outwardly into forcible engagement with the opposed inner surfaces of said reinforcing channel with the web extending across the open face of said channel;
   the said inset portions adapted to interfit the outer edge portions of said panels, with the lips thereof overhanging said edges to provide a weather seal;
   said limbs adapted to provide pressure engagement with the surface of the channel with the edges of said serrations providing line pressure engagement with the internal surfaces of the channel to frictionally lock the closure cap within the channel and providing a line weather seal.

References Cited
UNITED STATES PATENTS
1,959,597  5/1934  Plym _____ 52—624 X
3,213,584  10/1965  Bush _____ 49—489 X

FOREIGN PATENTS
554,907  1/1957  Italy.

FRANK L. ABBOTT, *Primary Examiner.*
RICHARD W. COOKE, JR., *Examiner.*
G. W. HORNADAY, *Assistant Examiner.*